(12) United States Patent
Koivukangas et al.

(10) Patent No.: US 7,369,846 B2
(45) Date of Patent: May 6, 2008

(54) DELIVERY OF MOBILE STATION OPERATIONAL AND SELF-PERFORMANCE TEST RESULTS TO NETWORK IN RESPONSE TO ENCRYPTED REQUEST MESSAGE

(75) Inventors: Tapio Koivukangas, Oulu (FI); Seppo Salow, Oulu (FI); Timo P. Tervo, Oulu (FI); Antti Hayrynen, Oulu (FI); Vesa Luiro, Oulu (FI)

(73) Assignee: Nokia Corporation, Espoo (FI)

( * ) Notice: Subject to any disclaimer, the term of this patent is extended or adjusted under 35 U.S.C. 154(b) by 446 days.

(21) Appl. No.: 10/493,843

(22) PCT Filed: Sep. 30, 2002

(86) PCT No.: PCT/IB02/04037

§ 371 (c)(1),
(2), (4) Date: Oct. 29, 2004

(87) PCT Pub. No.: WO03/041422

PCT Pub. Date: May 15, 2003

(65) Prior Publication Data

US 2005/0113029 A1    May 26, 2005

(30) Foreign Application Priority Data

Nov. 5, 2001  (EP)  .................................. 01309352

(51) Int. Cl.
*H04Q 7/20* (2006.01)
(52) U.S. Cl. ...................... 455/425; 455/423; 455/424; 455/418; 455/419; 455/420; 455/67.11; 455/67.14; 455/67.7; 455/410; 455/411; 455/414.1; 455/414.3; 713/168; 713/170; 713/176

(58) Field of Classification Search ..... 455/422.1–425, 455/67.11, 67.13–14, 67.7, 418–420, 414.1–414.3, 455/410–411; 379/1.01, 9.02–9.04, 14.01, 379/32.01; 713/168–176; 370/241, 241.1, 370/242–252
See application file for complete search history.

(56) References Cited

U.S. PATENT DOCUMENTS 5,222,140 A * 6/1993 Beller et al. .................. 380/30

(Continued)

FOREIGN PATENT DOCUMENTS

EP    1063861 A1    12/2000

(Continued)

*Primary Examiner*—Tuan Tran
(74) *Attorney, Agent, or Firm*—Harrington & Smith, PC

(57) ABSTRACT

A set of performance-related data that represents both normal and abnormal conditions in the network is determined and stored in a mobile station MS. The set or a sub-set of this data is transmitted to a computer for analysis upon a triggering event, and the MS user is informed of the analysis results. The triggering event is receipt by the MS of an encrypted message to transmit the set or sub-set of the data. The MS decrypts the received message using an associated public key stored in the MS and transmits the set or the sub-set of the performance-related data only in response to correctly decrypting the encrypted message. The public key is one of a set of public keys stored in the mobile station, wherein individual members of the set are associated with applications executable by the MS in cooperation with a received encrypted command or encrypted data set.

24 Claims, 5 Drawing Sheets

U.S. PATENT DOCUMENTS

| | | | |
|---|---|---|---|
| 5,425,076 A | 6/1995 | Knippelmier | 379/27 |
| 5,805,666 A * | 9/1998 | Ishizuka et al. | 379/1.01 |
| 5,987,306 A | 11/1999 | Nilsen et al. | 455/67.11 |
| 6,088,588 A * | 7/2000 | Osborne | 455/425 |
| 6,219,544 B1 | 4/2001 | Suutarinen | 455/423 |
| 6,308,071 B1 * | 10/2001 | Kalev | 455/446 |
| 6,400,929 B1 | 6/2002 | Ue et al. | 455/69 |
| 2001/0006891 A1 | 7/2001 | Cho | 455/425 |
| 2001/0049263 A1 * | 12/2001 | Zhang | 455/67.1 |

FOREIGN PATENT DOCUMENTS

| | | |
|---|---|---|
| WO | WO-98/38823 A2 | 9/1998 |
| WO | WO-99/23849 A1 | 5/1999 |
| WO | WO-99/35783 A1 | 7/1999 |
| WO | WO-01/76136 A1 | 3/2001 |
| WO | WO-01/35685 A1 | 5/2001 |

* cited by examiner

* CUSTOMER'S INPUT VIA PHONE UI

DELIVERY OF MOBILE STATION OPERATIONAL AND SELF-PERFORMANCE TEST RESULTS TO NETWORK IN RESPONSE TO ENCRYPTED REQUEST MESSAGE

FIELD OF THE INVENTION

This invention relates generally to radiotelephones and, in particular, to radiotelephones or mobile stations, such as those capable of operation with a cellular network, and that are further capable of executing a self-test and other diagnostic procedures and recording the results.

BACKGROUND OF THE INVENTION.

A persistent problem in the mobile station market has been the occurrence of a so-called No Fault Found (NFF) indication after a user or subscriber returns a purportedly nonfunctioning or malfunctioning mobile station to a dealer or to a network service provider. For example, the subscriber may report that the mobile station exhibits a particular problem or failure mode; however, a technician at a repair depot or center is unable to find any type of malfunction or problem with the returned mobile station, and must issue a NFF report. In a typical case the problem experienced by the subscriber may actually be the result of some temporary problem experienced by the wireless network itself, and not by the mobile station. For example, some network problem may cause the mobile station to repeatedly drop calls, or to be unable to obtain service.

It will be appreciated that this type of problem can be costly for the dealer and/or service provider, as well as for the manufacturer. In addition, the user may develop an unfavorable impression of the manufacturer of the mobile station, even though the problem experienced by the user lies totally outside the control of the manufacturer.

It is thus a first object and advantage of this invention to provide an improved radiotelephone and service provider interaction that overcomes the foregoing and other problems.

It is another object and advantage of this invention to provide a mobile station that stores and maintains a plurality of Product Performance Counters (PPCs) that are indicative of the electrical and operational state of the mobile station.

It is a further object and advantage of this invention to provide a mobile station that stores and maintains a set of PPCs, and that is further able to transmit the complete set or a subset of the PPCs to an external location for analysis.

It is one further object and advantage of this invention to provide a computer at a location external to the mobile station, the computer being capable of analyzing the PPCs, as well as other data inputs, to determine a fault status of the mobile station and/or wireless network.

It is another object and advantage of this invention to provide a mobile station that stores and maintains a set of PPCs and that operates, in response to receiving an encrypted PPC request message, for transmitting the complete set or a subset of the PPCs to an external location.

The foregoing and other problems are overcome and the objects and advantages are realized by methods and apparatus in accordance with embodiments of this invention.

SUMMARY OF THE INVENTION.

Disclosed herein is a method for operating a mobile station, as well as a mobile station and wireless system that operates in accordance with the method. The method has steps of: (A) during the operation of the mobile station, determining and storing a set of performance-related data (PPCs) in the mobile station; and (B) responsive to an occurrence of a triggering event, transmitting the set or a sub-set of the performance-related data to a computer for analysis. The performance-related data can be stored in counters and registers, or in memory locations that are managed so as to function as counters and registers. By example, the performance-related data can include a count of dropped calls, and/or an indication of a result of a mobile station self-test mode of operation. The triggering event can be a receipt by the mobile station of a message to transmit the set or sub-set of the performance-related data, or a receipt by the mobile station of an input from a user of the mobile station, or an expiration of a timer, or at least one of the performance-related data being equal to a threshold value (e.g., the number of dropped calls reaches some threshold value.)

In the presently preferred embodiment of this invention the triggering event message that is received by the mobile station is transmitted to the mobile station in an encrypted format, such as in an RSA format. In this embodiment the mobile station stores a public key for decrypting the received message, and responds to the message by transmitting the set or sub-set of the PPC data in an encrypted or in an unencrypted format to the network.

The step of transmitting the set or a sub-set of the performance-related data can include steps of receiving the transmitted set or sub-set of the performance-related data at a control center associated with a network service provider and/or at a (remote) diagnostic center, or at a local computer; and then analyzing the data with the computer to determine an indication of an occurrence of at least one of a fault in the mobile station, a fault in a system of the network service provider, or a no fault condition. An optional step transmits the determined indication to the mobile station. The analysis may further include determining statistical information regarding a population of mobile stations.

The step of analyzing the performance-related data may be performed in combination with at least one of wireless network performance data or information obtained from a user of the mobile station.

The public key stored in the mobile station may be one of a set of public keys stored in the mobile station: wherein individual members of the set of public keys are associated with applications executable by the mobile station in cooperation with at least one of an encrypted command and an encrypted data set received from the wireless network. The encrypted command and/or data set are decrypted by the mobile station using one of the set of public keys.

BRIEF DESCRIPTION OF THE DRAWINGS.

The above set forth and other features of the invention are made more apparent in the ensuing Detailed Description of the Invention when read in conjunction with the attached Drawings, wherein.

DETAILED DESCRIPTION OF THE INVENTION.

Figure 1:
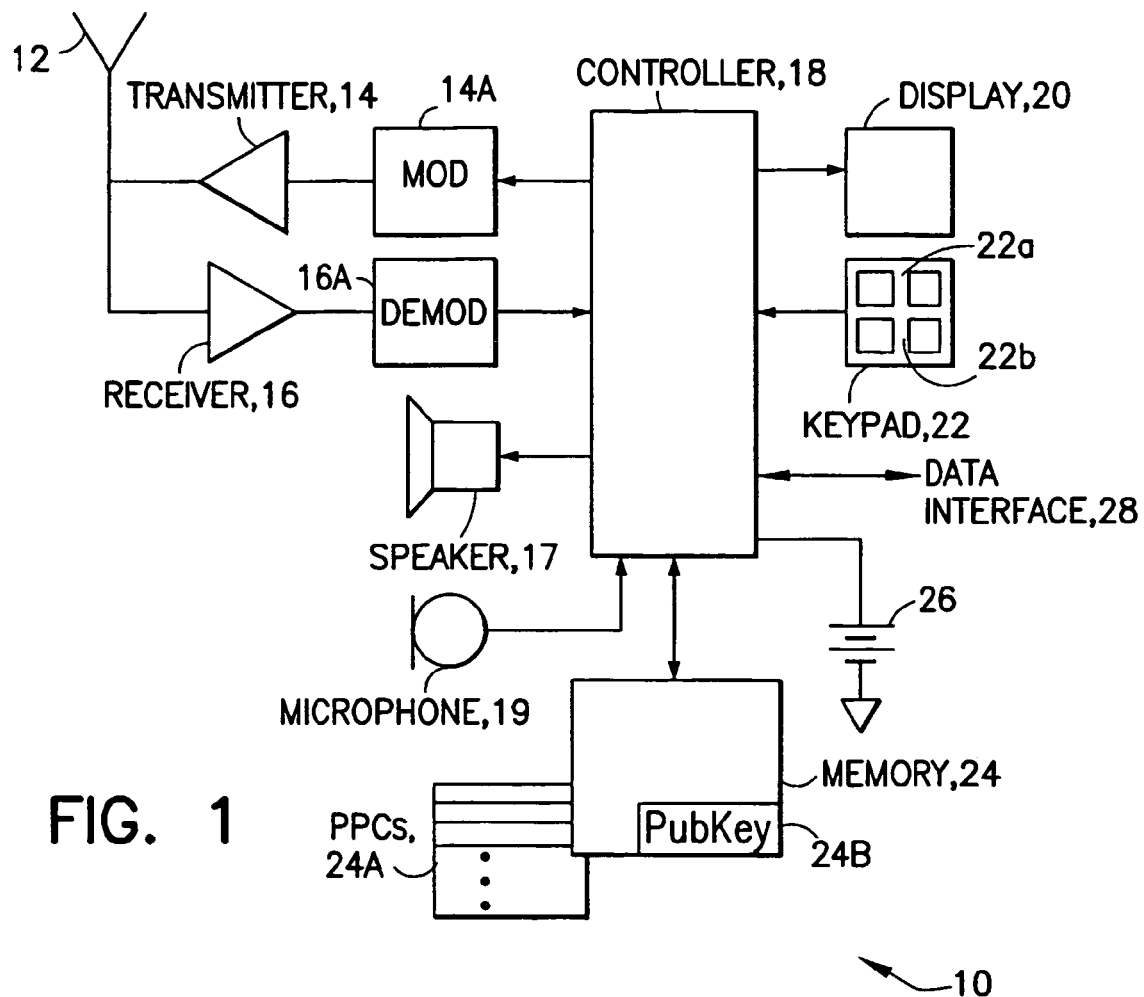
FIG. 1 is a block diagram of a mobile station that is suitable for practicing this invention.
Figure 2:
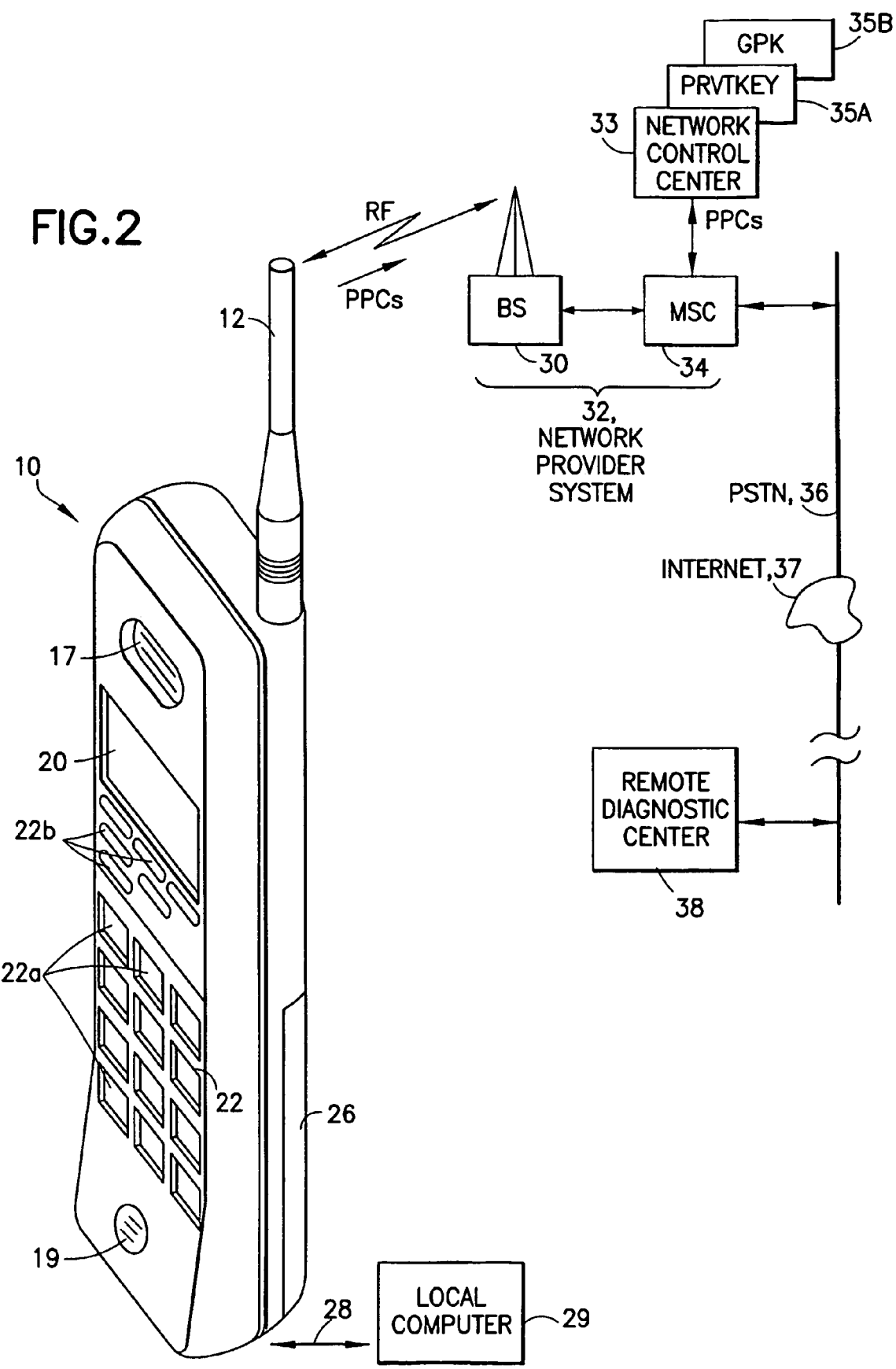
FIG. 2 is an elevational view of the mobile station shown in FIG. 1, and which further illustrates a wireless communication system and a service provider to which the mobile station is bidirectionally coupled through wireless RF links.

Reference is first made to FIGS. 1 and 2 for illustrating a radiotelephone, also referred to herein as a wireless mobile station 10, that is suitable for practicing this invention. The mobile station 10 may be, but is not limited to, a cellular telephone or a personal communicator. The mobile station 10 includes an antenna 12 for transmitting signals to and for receiving signals from a base site or base station 30. The base station 30 can be a part of a cellular network comprising a wireless network provider system 32, also referred to herein for simplicity as a wireless network 32, that further includes a mobile switching center (MSC) 34. The MSC 34 provides a connection to landline trunks when the mobile station 10 is involved in a call. A network control center 33 may also be provided, the network control center 33 being coupled to the MSC 34 for controlling the operation of the network provider system 32, as well as for receiving information from the mobile station 10 via the base station 30. The network control center 33 could be connected at one or more other points within the network provider system 32.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The particular type of air interface standard is not important to the operation of this invention, as the teachings of this invention apply to analog wireless systems (e.g., AMPS systems), as well as digital systems, including time division/multiple access (TDMA) and code division/multiple access (CDMA) systems. As an example, both conventional and advanced GSM-type systems can benefit form the teachings of this invention.

It is understood that the controller 18 also includes the circuitry required for implementing the audio (speech path) and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0-9) and related keys (#,*) 22a, and other keys 22b used for operating the mobile station 10. These other keys 22b may include, by example, a SEND key, various menu scrolling and soft keys, and a PWR key.

The mobile station 10 also includes a removable battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of wireless system parameters and the number assignment module (NAM). An operating program for controlling the operation of controller 18 is also stored in the memory 24 (typically in a ROM device). The operating program in the memory 24 may include routines to present messages and message-related functions to the user on the display 20, typically as various menu items. The memory 24 also includes routines for implementing the mobile station executed methods described below.

In accordance with an aspect of this invention, the memory 24 stores a set of Product Performance Counters (PPCs) 24A, individual ones of which are indicative of some aspect of the operation of the mobile station 10. In general, individual ones of the PPCs 24A could be true counters, such as one to record a number of dropped calls, while others may be considered more as registers for storing some value such as, by example, the magnitude of the received signal strength (RSS) at a time that a particular call is dropped. When stored in the memory locations of the memory 24, it can be appreciated that software employs the memory locations to emulate the function of counters and registers (e.g., by incrementing a particular memory location every time a dropped call occurs.)

In general, the PPCs 24A provide information regarding the wireless network quality, as well as information regarding the operation of the mobile station 10. In accordance with a further aspect of the invention, the set of PPCs 24A, or a subset thereof, are transmitted from the mobile station to the network provider system 32, via a base station 30. The PPCs 24A can be transmitted in response to a request received from the network provider system 32 or from some other requester, or on command from a user of the mobile station 10, or periodically at some predetermined interval of time, or upon an occurrence of some other triggering event (e.g., reaching a predetermined threshold number of dropped calls within some predetermined interval of operating time.)

The use of the PPCs 24A can be especially advantageous when characterizing new wireless specification features and new network application services, such as when a test group or population of mobile stations are deployed in the coverage area of the network provider system 32. By using a test group of mobile stations the service provider is enabled to collect the PPCs 24A over the air and thereby characterize coverage and other characteristics of interest. Feedback can also be given to the user's of the mobile stations 10, either by transmissions from the network provider for display on the display 20, and/or by other means, such as posting the results on a web page that can be accessed either through a conventional PC or wirelessly by the mobile stations 10.

During a call the set or a selected subset of the PPCs 24A can be transferred by the controller 18 via the transmitter 14 using, for example, a Short Message Service (SMS) feature, or by some other message-related feature, such as the Unstructured Supplementary Data Service feature of GSM, or as packet data, such as packet data conforming to the TCP/IP format sent over the internet 37. It is also within the scope of this invention to display on the display 20 the PPCs 24A to be transmitted, and then have the user speak the results to a human or machine (voice recognition) operator at the network control center 33. The PPCs 24 can be analyzed at the network control center 33 and/or at a remote diagnostic center 38 that is coupled to the network provider system 32 through conventional, phone lines (e.g., the Public Switched Telephone Network (PSTN) 36) or through a separate communications network. A connection to the internet 37 can be used for this purpose as well. The remote diagnostic center 38 may be located at the manufacturer of the mobile station 10 or at a sales or service center, or at a research and development center, or at any convenient or desirable location.

Figure 3:
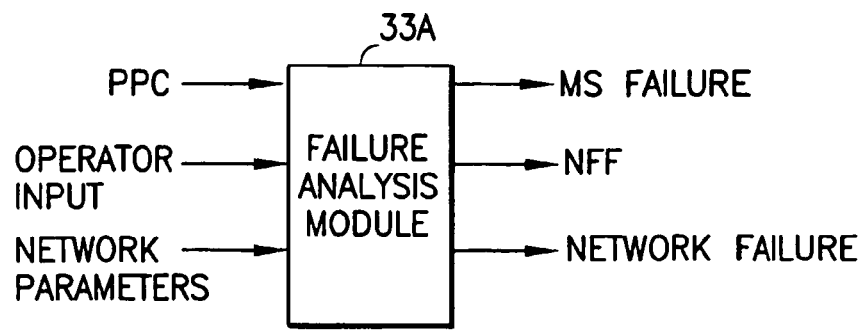
FIG. 3 is a diagram depicting the inputs and outputs of a software module that analyses PPCs and other information, and which provides outputs indicative of the operational state of the mobile station.

Referring now also to FIG. 3, the network control center 33 may include a failure analysis module (FAM) 33A, such as software running on a PC or mainframe computer. The FAM 33A receives as inputs the set or subset of the transmitted PPCs 24A, as well as mobile station self-test results if not a part of the PPCs 24A, an input from the network operator, such as information obtained from the user of the mobile station 10, as well as certain network parameters, such as base station power. Other inputs could be provided as well, such as RF propagation conditions in the service area of the network provider system 32. The FAM 33A processes these inputs using, for example, an expert system or a neural network, and outputs appropriate indications of mobile station/network functionality. These indications can include an indication of a failure of the mobile station 10, an indication of a failure of the network provider system 32, or a no fault found (NFF) indication. It is within the scope of the teaching of this invention to relay the output indication of the FAM 33A back to the mobile station 10, thereby providing the user with a real time or substantially real time failure analysis and fault detection. By example, the user may be informed in a closed-loop manner that based on the PPCs 24A previously transmitted, as well as on information obtained from the network operator, that the mobile station 10 is most likely fully functional (implying that either no fault exists or that the fault lies elsewhere, such as in the network provider system 32), or that the mobile station 10 is most likely experiencing some malfunction. In this latter case the user may bring the mobile station 10 to a local service center or to a dealer for an exchange or for repairs. However, it can be appreciated that in this latter case it has already been established that the mobile station 10 is most likely malfunctioning, thereby eliminating or significantly reducing the occurrence of the No Fault Found (NFF) situation discussed previously.

The set of PPCs 24A can include a number of different indications of mobile station functionality including, in addition to a number of dropped calls and/or unsuccessful call origination attempts (as well as signal strength indications), other indications such as the result of internal self-test programs (e.g., memory errors, abnormal program conditions and terminations, etc.), and also data collected periodically during periods of apparent normal operation. This latter indication is useful in establishing a baseline against which other indications can be compared. The PPCs 24A can also include indications of frame error rates, symbol error rates, a number of requests for re-transmission that occur during some interval of time, etc.

Figure 4:
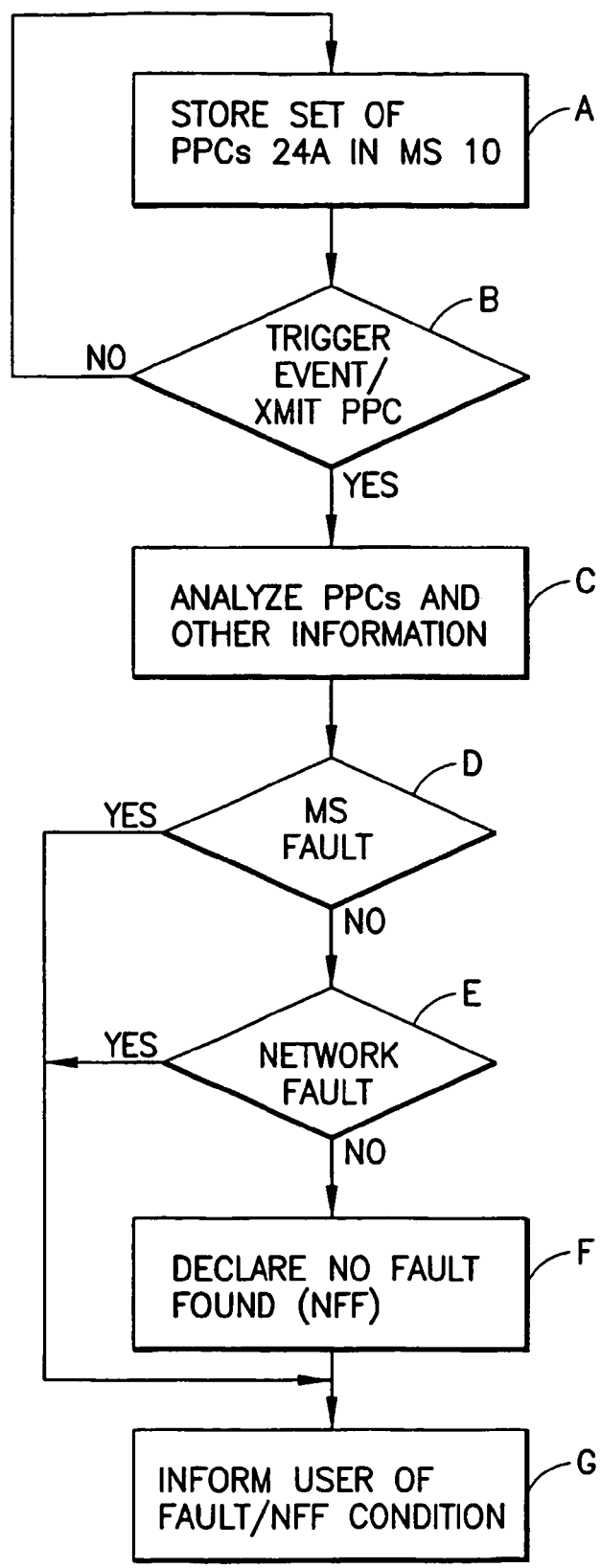
FIG. 4 is a logic flow diagram in accordance with a method of this invention.

Referring to the method depicted in FIG. 4, at Step A the mobile station 10 stores the set of PPCs 24A. This step may occur over a considerable period of time during the operation of the mobile station 10. At Step B a determination is made if some triggering event has occurred. The triggering event could be, for example, the receipt of a message requesting the mobile station 10 to transmit the set or subset of PPCs 24A, or an input from the user of the mobile station 10, or the expiration of a timer. If the triggering event has not occurred, control passes back to Step A to continue storing and/or updating the set of PPCs 24A. If the triggering event has occurred, then the set or the subset of PPCs 24A are transmitted from the mobile station 10 to the network provider system 32, via the base station 30. It is within the scope of this invention to selectively transmit the PPCs 24A, such as by transmitting only requested PPCs 24A (e.g., requested in a message transmitted to the mobile station 10), or by transmitting only a subset of the PPCs 24A to the network control center 33, while transmitting the complete set of PPCs 24A to the remote diagnostic center 38. The transmitted PPCs 24A may be encrypted prior to transmission, and subsequently decrypted at the receiving location, thereby assuring privacy of the transmitted PPC information.

In a presently preferred embodiment of this invention the triggering event message received from the wireless network 32 is encrypted, as discussed in further detail below, and is decrypted by the mobile station 10 after receipt. The PPC response data may or may not be encrypted by the mobile station 10 before transmitting same back towards the wireless network 32.

In any event, at Step C the FAM 33A, or an equivalent system at the remote diagnostic center 38, analyses the PPCs 24A, preferably along with the other information discussed above, such as network related information and/or information obtained by an operator from the user of the mobile station 10. At Step D a determination is made as to whether the PPCs 24A (and optional other information) indicate a mobile station fault. If yes, control passes to Step G, while if a mobile station fault is not indicated, a determination is made at Step E if a network fault is indicated. If yes, control passes to Step G, while if a network malfunction is not indicated, a determination is made at Step F that no failure or fault is found (NFF). Control then passes to Step G where a message may be formatted and sent to the mobile station 10 to indicate to the user the outcome of the PPC analysis.

Although described in the context of preferred embodiments, it should be realized that a number of modifications to these teachings may occur to one skilled in the art. By example, it can be appreciated that different types of mobile stations 10 may store different types of PPCs 24A. For example, a TDMA mobile station 10 may store one or more PPCs that relate to frame and time slot synchronization functions, while a CDMA mobile station may store one or more PPCs that relate to pseudonoise (PN) spreading code correlation functions.

It should be further realized that the PPCs 24A can be employed by the network operator and/or by the manufacturer of the mobile station to obtain statistical data relating to the operation of a population of mobile stations 10. For example, statistical information relating to a number of dropped calls within a certain geographical area (e.g., within a predetermined set of adjacent cells), as a function of received signal strength at the time the calls are dropped, as well as (optionally) the frame error rates being experienced, can be gathered and analyzed by mobile phone type (e.g., the operation of a newer model mobile station can be contrasted to the operation of an older model mobile station.)

Furthermore, this example can be expanded to cover as well the determination of fault location. By example, if the PPC data 24A indicates that the mobile station 10 has dropped three calls in the past ten minutes, and if associated signal strength indications show an adequate amount of signal strength, then the FAM 33A may determine that a fault may lie in the mobile station 10. However, if a plurality of mobile stations are found to be dropping calls, and if most of these are determined from the PPC data 24A or from the network-related parameter data to be located in the same cell, then a fault may lie instead in the base station 30, and not in the mobile stations 10. This is especially true if mobile station self-test results do not indicate a mobile station malfunction.

As another example, if the PPC data 24A indicates that the mobile station 10 is dropping calls, and if the associated signal strength indications do not show an adequate amount of signal strength (weak received signal), then the FAM 33A may still indicate that fault is most likely to be in the mobile station 10, if the mobile station self-test results indicate some mobile station malfunction.

Alternatively, if the PPC data 24A indicates that the mobile station 10 is dropping calls, and if the associated signal strength indications indicate a weak field strength (weak received signal), but if the mobile station self-test results does not indicate a mobile station malfunction, then the fault may be indicated as being most probably in the network provider system 32.

Alternatively, if the PPC data 24A indicates that the mobile station 10 is dropping calls, and if the associated signal strength indications indicate adequate or good field strength readings, and if the mobile station self-test results does not indicate a mobile station malfunction, then the fault may again be indicated as being most probably in the network provider system 32 (for example, the network may be too heavily loaded, or some network electronic unit is marginal or intermittent.)

It should also be realized that certain steps of the method shown in FIG. 4 can be executed in other than the order shown, and additional steps can be added, while still obtaining the desired result. For example, the order of execution of Steps D and E could be reversed, and the Step G could be bypassed either entirely or selectively (e.g., the user is notified only when the fault is determined to lie in the mobile station 10.)

It should further be noted that it is not necessary that the PPCs 24A be output from the mobile station 10 only by being transmitted through the wireless transmitter 14. For example, and referring again to FIG. 1, a mobile station data interface 28 can be used to transmit or output the PPCs 24A through a cable or an IR link to a local computer 29 (shown in FIG. 2) that has a suitable diagnostic program, similar or identical to the program that operates in the Network Control Center 33 or the Remote Diagnostic Center 38. In this case the local computer 29 could be installed at a point of sale location or a service center, or at any other convenient location, and is enabled to provide rapid feedback to the user as to a possible source of a problem being experienced by the user. Also in this case the triggering event that causes the controller 18 to transmit the PPCs 24A can be a receipt by the controller 18, through the data interface 28, of an interrogation signal sent from the local computer 29.

As was mentioned briefly above, it is within the scope of these teachings to require that the wireless network 32 encrypt or "sign" the PPC request message prior to transmitting the message to the mobile station 10. In this manner the structure of the PPC request message is not readily determinable by third parties, and thus it becomes less likely that the mobile station 10 would respond to a PPC request message sent from other than an authorized source of PPC request messages. This can be important if the mobile station 10 responds to the requestor using, for example, an SMS message, where the mobile station user would be charged a fee for sending the SMS message. A presently preferred, but certainly not limiting encryption algorithm is one based on RSA.

Briefly, RSA is a public-key cryptosystem developed at MIT in 1977 in an effort to aid in ensuring internet security. A cryptosystem may be considered to be an algorithm that can convert input data into something unrecognizable (encryption), and convert the unrecognizable data back to its original form (decryption). To encrypt data, one enters the data ("plaintext") and an encryption key to the encryption portion of the algorithm. To decrypt the "ciphertext," a proper decryption key is used at the decryption portion of the algorithm. These keys are referred to as a public key and a private key, respectively. For example, to send data from A to B, A looks-up or otherwise has knowledge of the public key of B, and then encrypts the data the using the public key of B. The public key, however, will not decrypt the ciphertext. In order for B to decrypt the received ciphertext, B must use B's private key. If B wishes to respond to A using an encrypted response, B must encrypt the response using A's public key.

In a public-key cryptosystem such as RSA it is important that a user's private key cannot be determined. This is accomplished through the use of a one-way function. With a one-way function, it is straight-forward to compute a result given certain in put values. However, it is extremely difficult, preferably nearly impossible, to determine the original values if one starts with the result. The one-way function used in RSA is multiplication of prime numbers. In general, it is relatively easy to multiply two large prime numbers, but for most very large primes, it is extremely time-consuming to factor them. Public-key cryptography thus constructs a cryptosystem that uses two large prime numbers to form the private key, and the product of the prime numbers to form the public key.

In accordance with an aspect of this invention a secret, private key (PrvtKey) 35A is stored in the network 32, such as at the network control center 33 or at the remote diagnostic center 38, along with a general public key (GPK) 35B of mobile stations associated with a specific service which, in this case, is the PPC service. The mobile station 10 stores the general public key Pub Key is stored in the mobile station 10, such as in a location 24B of the memory 24. When the encrypted message arrives from the wireless network 32 it is decrypted by the data processor 18 of the mobile station 10 using the associated public key stored in the location 24B. Only in response to decrypting a valid request for PPC data does the mobile station 10 transmit the set or the sub-set of PPC data to the wireless network 32 (Step B of FIG. 4). The response could be encrypted by the mobile station 10, although this is not a requirement for most types of response, such as the PPC data response, as there is typically nothing secret or confidential in the response data, or it is otherwise unrecognizable by a third party.

In this technique it can be appreciated that only the general public key(s) need be stored in the mobile stations 10, while the secret or private key 35A is securely stored in a main server maintained by the wireless service provider 32. In this manner the instruction set and/or data that is sent to the mobile station 10 is also secured, thereby maintaining the application structure secret and preventing unauthorized third parties from attempting to use the application and the associated parts of the system.

Note should be made that when using this technique the mobile station 10 could store n separate public keys corresponding to a set of n different applications. In this manner the mobile station 10 responds to a given application initiated by the wireless network 32 only if the triggering event, e.g., the receipt of a valid message and an optional data set, can be accurately decrypted using one of the n stored public keys.

In other embodiments of this invention other than the RSA cryptosystem can be employed.

Figure 5:
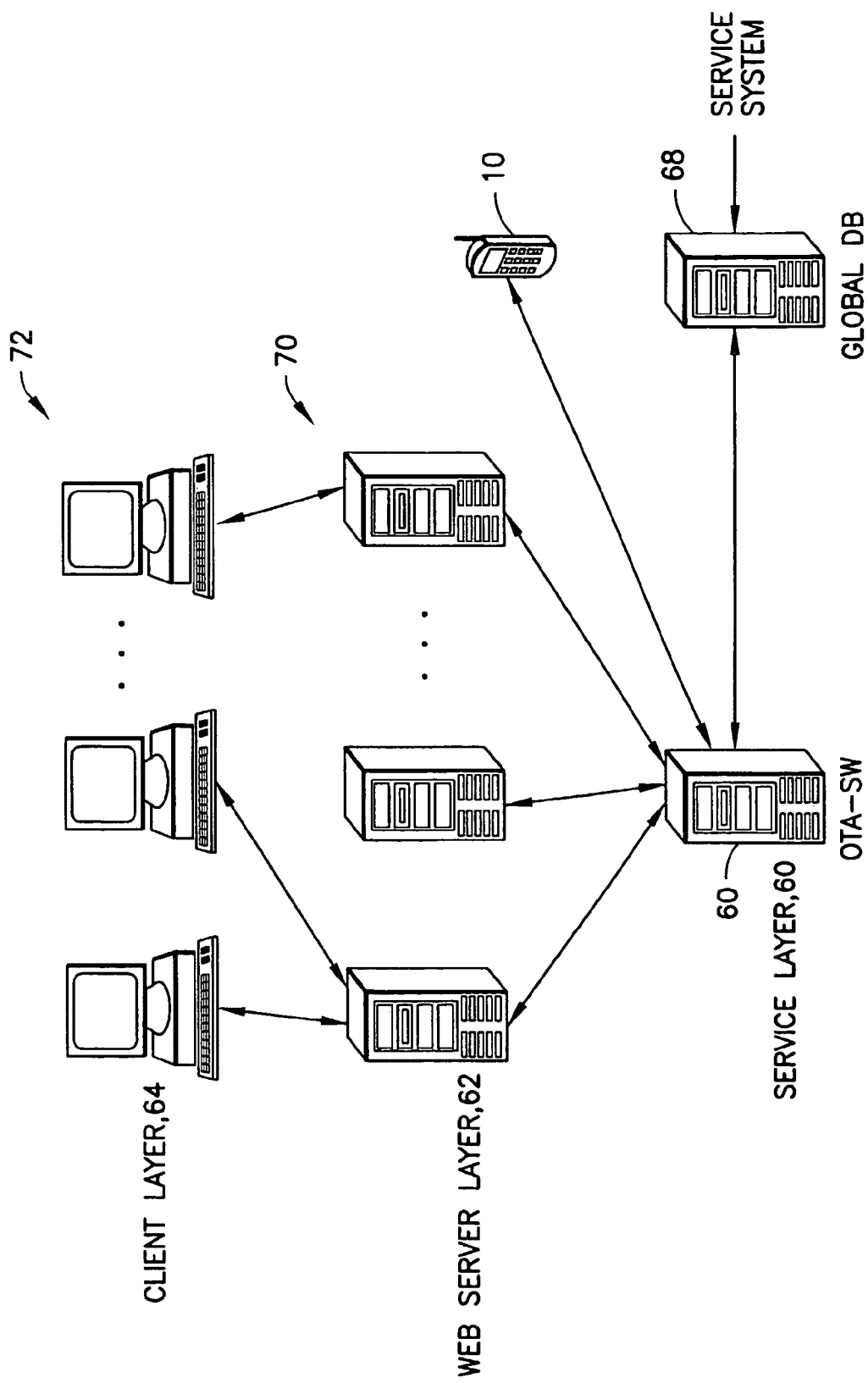
FIG. 5 is a system level diagram showing an over the air activation (OTA) system in accordance with an aspect of these teachings.

FIG. 5 shows a system level diagram that includes an over the air activation (OTA) system in accordance with an aspect of these teachings. In this system there is a service layer 60, a web server layer 62 and a client layer 64. The service layer 60 includes an OTA server running OTA software (SW) 66 that communicates with a global systems service data base 68. The web server layer 62 is populated with web servers 70, and the client layer 64 is populated with PCs and/or workstations, generally referred to as terminals 72, that are located at, for example, research and development (R&D) facilities, customer support locations and point of sale (POS) locations. The terminals 72 communicate with the OTA server 66 via the internet or some other network through the web server layer 62. In accordance with these teachings the PPC data set is obtained from the mobile station 10 using an encrypted PPC request message sent from the OTA server 66. The retrieved information can then be stored in the global data base 68 and/or it can be provided to one or more of the terminals 72 at the client layer 64 for review and analysis.

Figure 6:
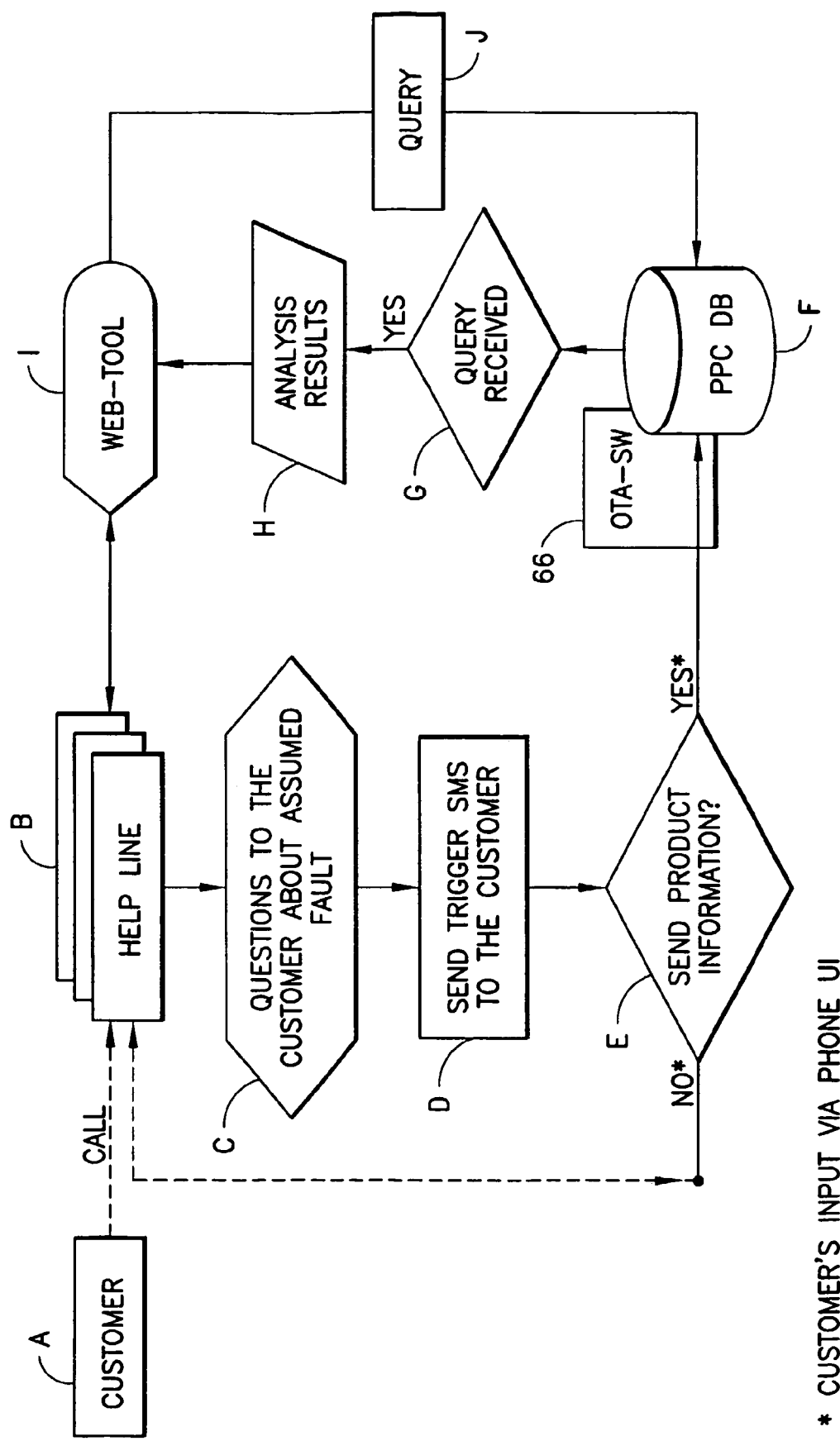
FIG. 6 is a logic flow diagram of a PPC retrieval method in accordance with these teachings.

FIG. 6 shows a logic flow diagram of an exemplary PPC retrieval method in accordance with these teachings. At Step A customer calls a help line to report a perceived problem with the customer's mobile station 10. This call by the customer could as well be made through the internet 37, and need not be a voice call. At Steps B and C a dialogue is conducted with the customer concerning the assumed fault in the customer's mobile station 10 At Step D a trigger SMS message is sent to the customer's mobile station 10 to elicit the sending of the PPC data. All or part of the trigger SMS message could be encrypted, such as by using the RSA encryption technique discussed above. At Step E a determination is made if the PPC data will be transmitted by prompting the customer as to whether the PPC data should be transmitted. The sending of the PPC data could be free of charge to the customer, or a fee might be involved. If the customer elects not to transmit the PPC data, control returns to Step B to continue the dialog with the customer. If the customer indicates that the PPC data is to be transmitted, control passes to Step F to transmit all or a sub-set of the PPC data from the mobile station 10, via the OTA SW 66, and the data is stored into a PPC data base at the wireless network 32. The PPC data base may be the global data base 68 shown in FIG. 5. At steps G and H the PPC data base is queried for the PPC data from the mobile station 10 and the data is analyzed. The results of the analyses can be passed back to the help line using a web tool at Step I for verbally informing the customer of the result, or the results could be sent to the customer over the internet 37 via the web server layer 62 of FIG. 5. If necessary, the web tool at Step I may directly query the PPC data base at Step J.

The end result is an improvement in the diagnosis of the customer's perceived mobile station fault, a reduction in cost for the network, operator 32 and possibly also the manufacturer of the mobile station 10, and an improvement in customer satisfaction.

While the invention has been particularly shown and described with respect to preferred embodiments thereof, it will be understood by those skilled in the art that changes in form and details may be made therein without departing from the scope and spirit of the invention.

The invention claimed is:

1. A method for operating a mobile station comprising:
   during the operation of the mobile station within a network, determining and storing a set of performance-related data in the mobile station, said performance-related data comprising information that represents both normal and abnormal conditions in the network and in the mobile station;
   responsive to a triggering event, transmitting the set or a sub-set of the performance-related data to a computer for analysis; and
   receiving at the mobile station a message for informing a user of the result of the analysis,
   wherein the triggering event is comprised of a receipt by the mobile station of an encrypted message to transmit the set or sub-set of the performance-related data, and further comprising decrypting the received message using an associated public key stored in the mobile station and transmitting the set or the sub-set of the performance-related data only in response to correctly decrypting the encrypted message,
   further wherein the public key stored in the mobile station is one of a set of public keys stored in the mobile station, wherein individual members of the set of public keys are associated with applications executable by the mobile station in cooperation with at least one of an encrypted command and an encrypted data set received from the wireless network that are decrypted by the mobile station using one of the set of public keys.

2. The method of claim 1, where the performance-related data is stored in counters and registers.

3. The method of claim 1, wherein the performance-related data is comprised of a count of dropped calls.

4. The method of claim 1, wherein the performance-related data is comprised of an indication of a result of a mobile station self-test mode of operation.

5. The method of claim 1, wherein transmitting the set or a sub-set of the performance-related data comprises:
   receiving the transmitted set or subset of the performance-related data at a control center associated with a network service provider; and
   analyzing the data to determine an indication of an occurrence of at least one of a fault in the mobile station, a fault in a system of the network service provider, or a no fault condition.

6. The method of claim 1, wherein transmitting the set or a sub-set of the performance-related data comprises:
   receiving the transmitted set or sub-set of the performance-related data at a remote diagnostic center; and
   analyzing the data to determine an indication of an occurrence of at least one of a fault in the mobile station, a fault in a system of the network service provider, or a no fault condition.

7. The method of claim 1, wherein the analysis includes determining statistical information regarding a population of mobile stations.

8. The method of claim 1, wherein the analysis includes determining whether an operational fault has occurred and, if it has, determining whether the operational fault occurred in the mobile station or in the wireless network that serves the mobile station.

9. The method of claim 1, wherein transmitting the set or a sub-set of the performance-related data comprises:
   receiving the transmitted set or sub-set of the performance-related data at a local computer that is coupled to the mobile station through a data interface; and
   analyzing the data to determine an indication of an occurrence of at least one of a fault in the mobile station, a fault in a system of the network service provider, or a no fault condition.

10. The method of claim 1, wherein determining and storing a set of performance-related data in the mobile station comprises continually determining the set of performance-related data in the mobile station.

11. A mobile station comprising a wireless transceiver for conducting bidirectional communications with a wireless network, said mobile station further comprising a memory and a controller coupled to said memory and to said transceiver, characterized by said controller being operable for determining, during the operation of said mobile station, a set of performance-related data and for storing said determined set of performance-related data in said memory, wherein said performance-related data comprises information that represents both normal and abnormal conditions in the network and in the mobile station, said controller being responsive to an occurrence of a triggering event for transmitting said set or a subset of said performance-related data to a computer for analysis;

wherein the triggering event is comprised of a receipt by the mobile station of an encrypted message to transmit the set or sub-set of the performance-related data, and said controller being responsive to the receipt of the message for decrypting the received message using an associated public key stored in the mobile station and for transmitting the set or the sub-set of the performance-related data only in response to correctly decrypting the encrypted message, further wherein the public key stored in the mobile station is one of a set of public keys stored in the mobile station, wherein individual members of the set of public keys are associated with applications executable by the mobile station in cooperation with at least one of an encrypted command and an encrypted data set received from the wireless network, the encrypted command and data set being decrypted by the mobile station using the associated one of the set of public keys.

12. A mobile station as in The mobile station of claim 11, wherein said performance-related data is stored in at least one of hardware counters and registers and memory locations functioning as counters and as registers.

13. The mobile station of claim 11, wherein said performance-related data is comprised of at least one of a count of dropped calls and an indication of a result of a mobile station self-test mode of operation.

14. The mobile station of claim 11, wherein said triggering event is comprised of a receipt by said controller, via said transceiver, of a message to transmit said set or sub-set of said performance-related data.

15. The mobile station of claim 11, wherein said computer comprises a part of a control center associated with a network service provider, and wherein said computer analyzes said performance-related data to determine an indication of an occurrence of at least one of a fault in said mobile station, a fault in a system of said network service provider, or a no fault condition.

16. The mobile station of claim 15, wherein said network service provider transmits said indication to said mobile station controller via said mobile station transceiver.

17. The mobile station of claim 11, wherein said computer comprises a part of a diagnostic center, and wherein said computer analyzes said performance-related data to determine an indication of an occurrence of at least one of a fault in said mobile station, a fault in a system of said network service provider, or a no fault condition.

18. The mobile station of claim 17, wherein said diagnostic center transmits said indication to said mobile station controller via said mobile station transceiver.

19. The mobile station of claim 17, wherein said diagnostic center is bidirectionally coupled to a data communications network for receiving said transmitted performance-related data therefrom, and for transmitting said indication thereto.

20. The mobile station of claim 17, wherein said diagnostic center is bidirectionally coupled to the internet for receiving said transmitted performance-related data therefrom, and for transmitting said indication thereto.

21. The mobile station of claim 11, wherein said analysis includes determining statistical information regarding a population of mobile stations.

22. The mobile station of claim 11, wherein encrypted message comprises an SMS message that is at least partially encrypted, and transmitting the set or the subset of the performance-related data comprises transmitting a reply SMS message only in response to correctly decrypting the encrypted SMS message.

23. The mobile station of claim 11, wherein said controller is operable for continually determining the set of performance-related data.

24. A method for operating a mobile station comprising:

during the operation of the mobile station within a network, determining and storing a set of performance-related data in the mobile station, said performance-related data comprising information that represents both normal and abnormal conditions in the network and in the mobile station;

receiving at the mobile station an encrypted message to transmit the set or sub-set of the performance-related data, and in response to correctly decrypting the received encrypted message using an associated public key stored in the mobile station, transmitting from the mobile station a set or a sub-set of the performance-related data to a computer for analysis;

wherein the associated public key stored in the mobile station is one of a set of public keys stored in the mobile station, wherein individual members of the set of public keys are associated with applications executable by the mobile station in cooperation with at least one of an encrypted command and an encrypted data set received from the wireless network that are decrypted by the mobile station using one of the set of public keys.

* * * * *